T. J. GEE.
THRESHING MACHINE, MAIZE SHELLER, OR LIKE MACHINE.
APPLICATION FILED APR. 14, 1914.
1,165,241.
Patented Dec. 21, 1915.
4 SHEETS—SHEET 1.
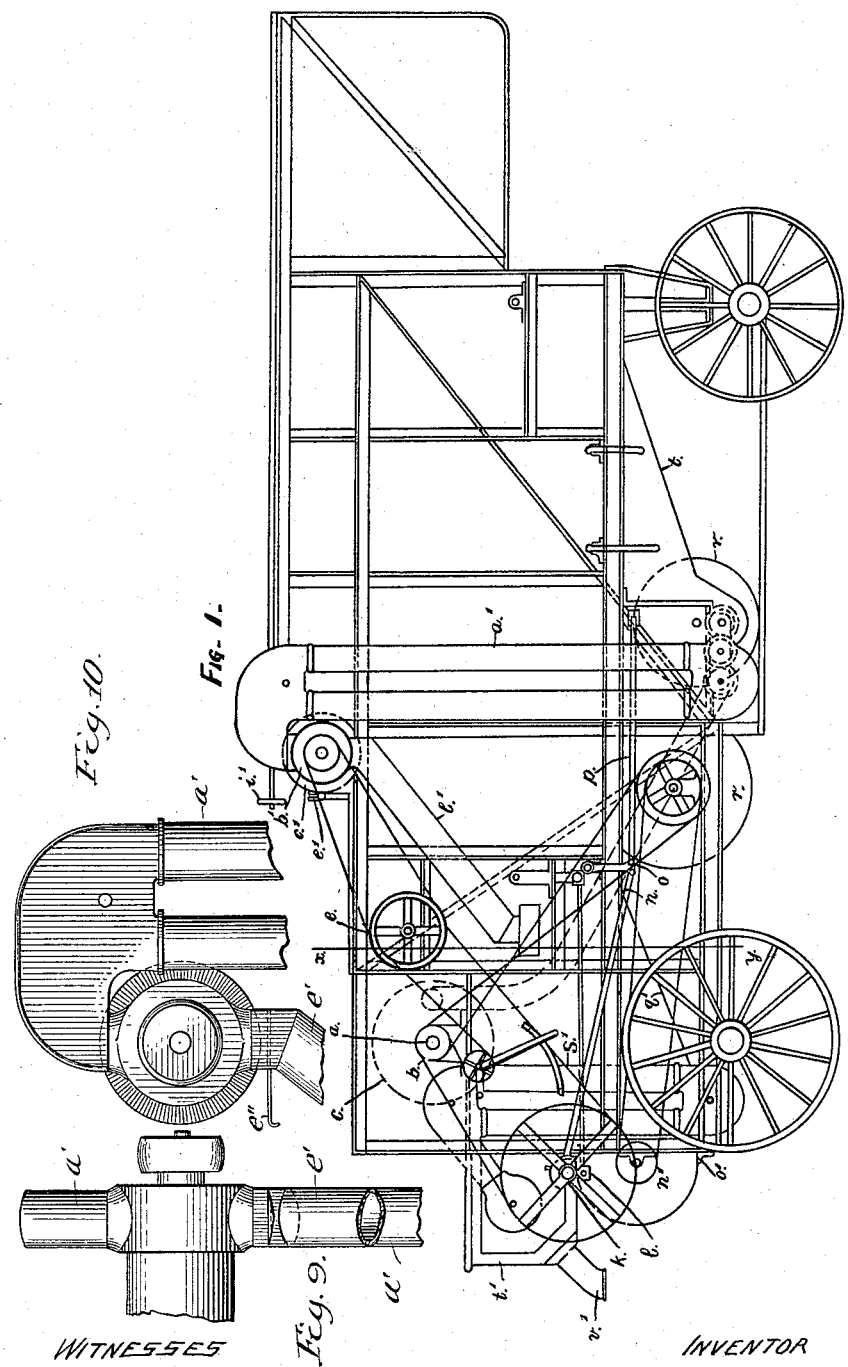
WITNESSES
INVENTOR
T. J. GEE
ATTORNEY T. J. GEE.
THRESHING MACHINE, MAIZE SHELLER, OR LIKE MACHINE.
APPLICATION FILED APR. 14, 1914.
1,165,241.
Patented Dec. 21, 1915.
4 SHEETS—SHEET 2.
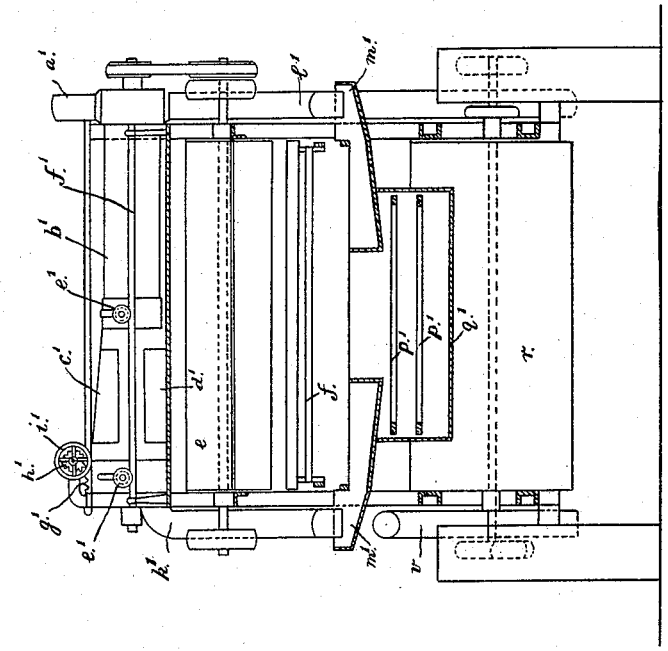
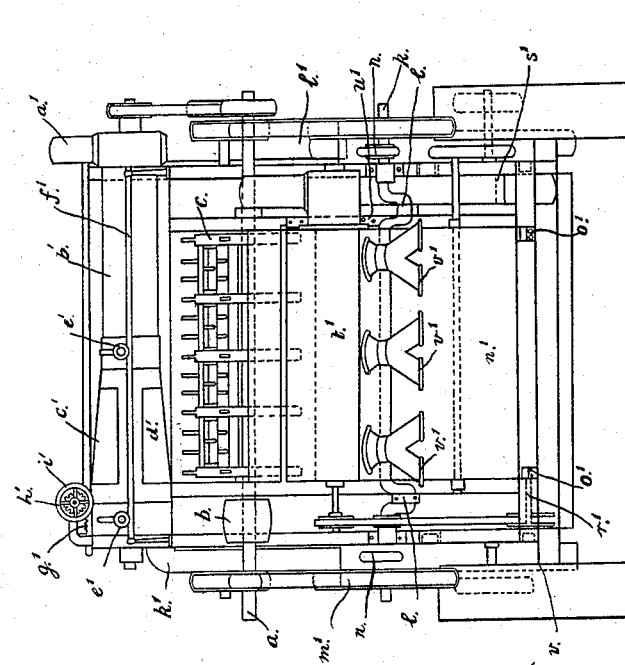
WITNESSES
Alfred R Anderson
Cornelius Hoving
INVENTOR
T. J. GEE
By H van Oldenmel
ATTORNEY

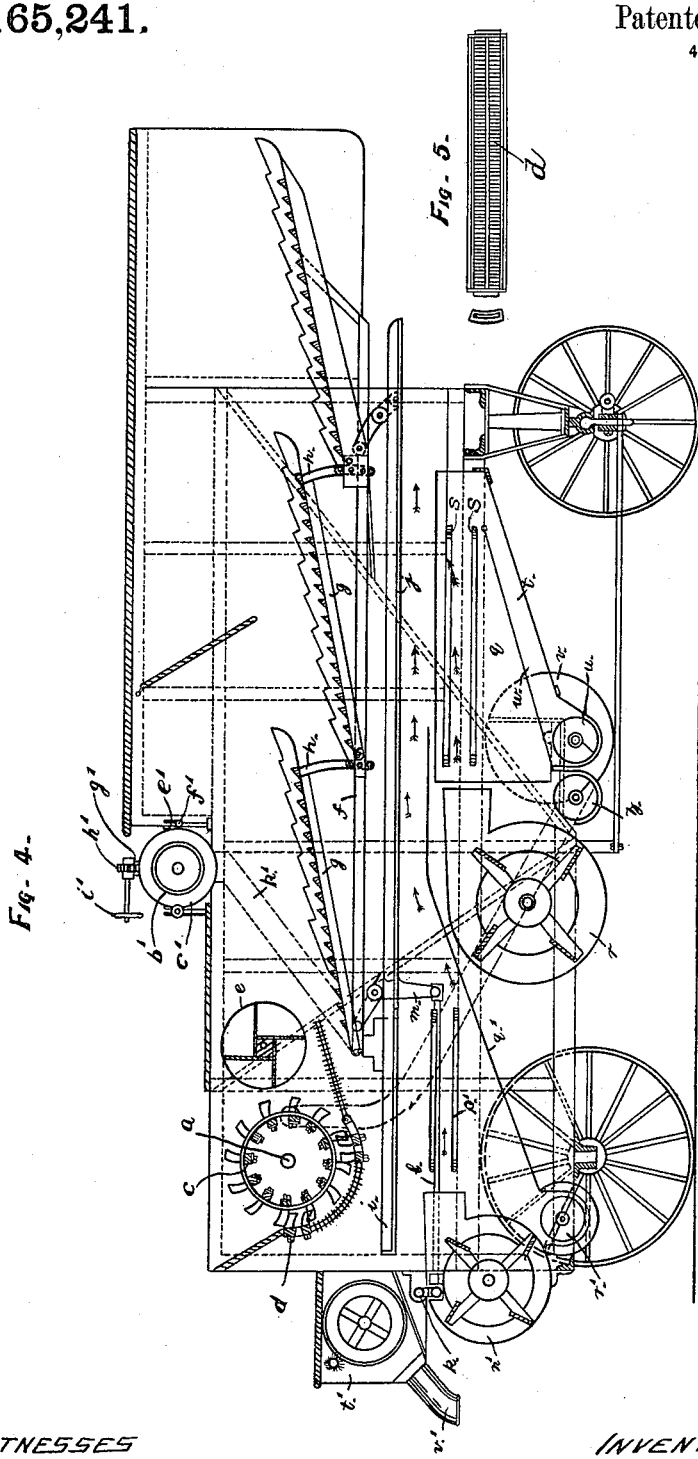

T. J. GEE.
THRESHING MACHINE, MAIZE SHELLER, OR LIKE MACHINE.
APPLICATION FILED APR. 14, 1914.
1,165,241.
Patented Dec. 21, 1915.
4 SHEETS—SHEET 4.
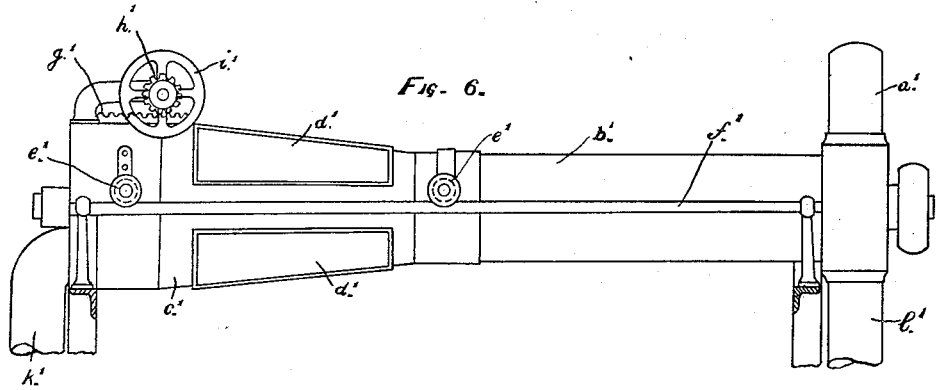
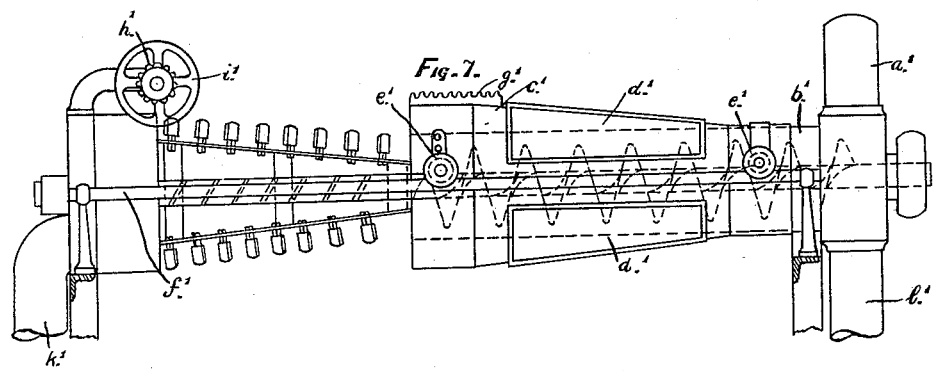
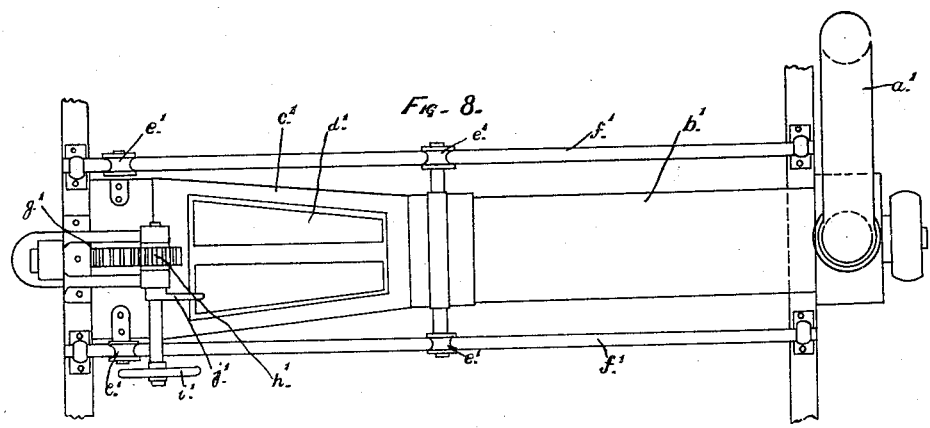
WITNESSES
Alfred R. Anderson
Cornelius Hoving
INVENTOR
T. J. GEE
By F. Van Dedemmel
ATTORNEY

UNITED STATES PATENT OFFICE.

THOMAS JOHN GEE, OF BUENOS AIRES, ARGENTINA.

THRESHING-MACHINE, MAIZE-SHELLER, OR LIKE MACHINE.

1,165,241.  Specification of Letters Patent.   Patented Dec. 21, 1915.

Application filed April 14, 1914. Serial No. 831,701.

*To all whom it may concern:*

Be it known that I, THOMAS JOHN GEE, a subject of the King of the United Kingdom of Great Britain and Ireland, and resident of Buenos Aires, Argentina, have invented a certain new and useful Improvement in Threshing-Machines, Maize-Shellers, or like Machines, of which the following is a specification.

This invention relates to a threshing machine, maize sheller or like machine of improved construction designed to meet the demand for a machine of large capacity and light weight, and capabale of being sold at a moderate price.

The improved machine has all the advantageous features of the so-called English threshing machine, but in addition it has a much greater threshing and cleaning capacity, while its weight is little more than one-half that of an English threshing machine of the same size.

The improved machine is further designed to do the same work as is at present done by three separate machines, viz., an alfalfa or clover huller, an ordinary threshing machine and a maize-sheller.

The driving mechanism including the bearings for the various shafts and the pulleys and belts is arranged outside the framework of the machine, whereby these parts can be readily got at by the attendant from the ground level without loss of time and risk of accident liable to occur when the attendant is obliged to climb about inside the machine.

The frame of the machine is made of metal thereby reducing the risk from fire, and also facilitating the manufacture which has been hampered on account of the scarcity and cost of the high grade of seasoned timber required for this class of work. Provision may also be made to permit of the ready attachment of labor-saving devices, such as automatic feeders and windstackers, as required in different countries.

With the last mentioned object in view the machine is designed to be capable of use with either a beater or peg threshing cylinder, according to the option of the user, the said cylinder being fitted adjacent to the front end of the machine as low down as possible, in order to facilitate the fitting on of an automatic feeder and at the same time to take full advantage of the entire length of the machine for the purpose of separating and cleaning the grain.

For separating and cleaning the grain, there are provided two large overshot blowers, one behind the other, each adapted to deliver a powerful blast in a horizontal direction right through the machine, and both arranged to play on to riddles which have a large separating surface. With this arrangement the blower which corresponds to the first set of dressing riddles can very readily blow away the chaff over the short distance between these riddles and the delivery end of the machine, while the blast from the second blower or recleaner, after it has passed over the second set of dressing riddles, can be further utilized as it passes out to the end of the machine, the blast, in the course of its passage out of the machine, serving to separate the grain from the chaff as it falls from the large caving riddle and shakers.

After the grain has been cleaned by the first set of dressing riddles and blower it is elevated to the smutter, and it can then be either passed through the smutter or delivered direct to the second set of dressing riddles.

The smutter or awner is placed on the top of the machine behind, and at a higher level than, the cylinder, being conveniently accessible for adjusting and cleaning purposes, and is provided with an outer casing which is adjustable during the running of the machine and by aid of which a much better class of work can be done when threshing alfalfa, clover or similar cereals.

The shaker grate is provided with adjustable risers so that it can be raised or lowered to suit the condition of the straw and the class of grain, and thereby permit of the straw being quickly delivered or retained for a greater length of time on the shaker grate, so as to insure a better separation, it being understood that in case the machine is to be used as a maize-sheller the risers may be lowered to their full extent, and a propeller and cage fitted in lieu of the threshing cylinder and concaves.

The frame of the machine is built of light section angle and channel iron and lined with sheet metal in place of being constructed with the usual oak frame and lining boards.

The rotary screen is located at the front end of the machine below the level of the threshing cylinder so that it can be easily operated, the cover of said screen serving as a platform for the attendant when feeding the machine by hand.

In the accompanying drawings which illustrate the invention, Figure 1 is a side elevation and Fig. 2 an end elevation of the improved threshing machine; Fig. 3 is a section on the line X—Y, Fig. 1; Fig. 4 is a longitudinal section showing the machine fitted with a peg threshing cylinder, which cylinder can be removed and replaced by a beater threshing cylinder; Fig. 5 is a detail view showing a section of a concave which is used with a beater threshing cylinder, the concaves being made in short sections so that they can be readily removed and replaced by others of a different type according as the machine is to be used on grain, clover or maize, or according to the selection of the type of cylinder to be employed. Fig. 6 is a side elevation of the smutter; Fig. 7 is an elevation showing the casing of the smutter adjusted to a different position; Fig. 8 is a plan showing the smutter in operative position. Figs. 9 and 10 are detail views showing the upper end of the smutter casing and connections for leading grain thereto and therefrom.

Referring to the drawing, $a$ is the cylinder shaft which is driven by the main driving pulley $b$ and to which is keyed the threshing cylinder $c$, at the back of which latter is the revolving beater $e$. The cylinder $c$ coöperates with the concaves $d$ which are made in sections as shown in Fig. 5 and are interchangeable to suit the class of grain to be threshed. In the present instance a removable peg threshing cylinder is shown.

$f$ is a shaker grate to which the straw passes from the beater $e$, said grate being provided with adjustable risers $g$ adapted to be raised and lowered by means of the quadrants $h$. Below the grate $f$ is the grain pan $i$ in the rear of which is the main caving riddle $j$. The required motion is imparted to the shakers by means of the crank $k$ and connecting rods $l$ which latter are operatively connected to the rocking arms $m$, $m$ for vibrating the grate $f$; two eccentric rods $n$ driven by the same crank $k$ impart the necessary motion to the shoe $q$ by means of the rocking levers $o$ and the connecting rods $p$. The shoe and shaker crank are disposed on the outside of the machine.

$r$ is the blower for the first set of dressing riddles $s$, which latter are located below the caving riddle $j$.

$t$ is a hinged chute for the capes which are conveyed by means of the helical conveyer $u$ from the chute $t$ to the elevator $v$ by which they are led back to the cylinder $c$.

$w$ is the grain chute for conducting the grain to the helical conveyer $z$ which conveys the grain to the grain elevator $a^1$ leading to the top of the machine, whence the grain is delivered to the smutter $b^1$.

Coöperating with the smutter $b^1$ is a sliding casing $c^1$ provided with covers $d^1$ which may consist of wire netting to allow the dust to pass through, or which may consist of blank plates. Secured to the casing $c^1$ are grooved rollers $e^1$ adapted to travel on horizontal bars $f^1$. To provide for adjustment of the casing there is secured thereto a rack $g^1$ which meshes with a pinion $h^1$ operated by a hand wheel $i^1$. It will be understood that the casing can be brought quite close to the revolving knives of the smutter, thereby permitting the best class of work to be done; when adjusted, the casing is held in position by a locking lever $j^1$.

$k^1$ is a downtake pipe which delivers to a grain hopper $m^1$, located below the grain pan $i$, the grain which has passed through the smutter $b^1$, and $l^1$ is a downtake pipe which delivers the grain to the hopper $m^1$ in case it should not be necessary to pass the grain through the smutter $b^1$, a slide $e''$ being provided which is thrown back if grain is to pass through the pipe $l^1$. From the hopper $m^1$ the grain passes to the second set of dressing riddles $p^1$ below said hopper. The riddles $p^1$ and the blower $n^1$ for said riddles are located low down and beneath the threshing cylinder, the blower $n^1$ being fitted with hinges $o^1$ so as to be capable of being opened in a downward direction to permit the dressing riddles $p^1$ to be changed.

$q^1$ is the grain chute which conducts the grain to the helical conveyer $r^1$ serving to deliver the grain to the short elevator $s'$ which discharges the grain into the screen $t^1$. The screen $t^1$ is fitted with hinges $u^1$ Fig. 2 so that it may be opened in a horizontal direction to permit of removal of the threshing cylinder; $v^1$ denotes sack attachments.

The operation of the machine is as follows:—The cylinder $c$ is rotated after the concaves $d$ have been changed to suit the class of grain to be threshed. After the straw has passed through the concaves it is kept moving forward by the revolving beater $e$ and then passes on to the shaker grate $f$. The grain, on being separated from the straw, falls on to the grain pan $i$ and is then carried forward on to the caving riddle $j$. The blower $r$ sends a powerful blast across the first set of dressing riddles $s$, through which riddles the grain falls on to the grain chute $w$. The unthreshed ears of wheat or capes which are carried over these riddles fall into the chute $t$ and are conveyed by means of the helical conveyer $u$ and the elevator $v$ back to the threshing cylinder $c$. The threshed grain, after falling upon the grain chute $w$, is conveyed by means of the helical conveyer $z$ and the elevator $a^1$ to the top of the machine and delivered into the end of the smutter or awner $b^1$. After the grain has passed through the smutter it is delivered to the recleaner or second set of dressing riddles by means of the downtake pipe $k^1$, or, in case the attendant does not desire to pass the grain through the smutter, a slide $e''$ is thrown back and the grain allowed to pass through the downtake pipe $l^1$. When delivered from either of these pipes the grain passes on to the hopper $m^1$ and after being discharged from this hopper $m^1$ on to the riddles $p^1$ is subjected to a powerful blast of air from the blower $n^1$. This blast then travels forward and plays upon the grain and chaff as it is falling on to the first set of dressing riddles, and thus materially helps in blowing away the chaff and preparing the grain for the first dressing blower and riddles. When the grain has passed through the second set of dressing riddles $p^1$ it falls upon the chute $q^1$ and is then delivered to the conveyer $r^1$ and conveyed by the latter to the short elevator $s^1$ which in turn delivers the grain to the rotary screen $t^1$, where the grain is classified and delivered to the sacks by means of the sack attachments $v^1$.

What I claim is: —

1. In a threshing machine, maize sheller or the like, in combination with a threshing cylinder, and means coöperating with said cylinder, a shaker grate to receive the beaten straw, a grain pan and caving riddles beneath said grate, a first set of dressing riddles beneath said caving riddles, a smutter at the upper end of said machine, a second set of dressing riddles below said cylinder, means adapted at choice to feed the grain from said first set of dressing riddles to said second set of dressing riddles direct or by way of said smutter, a blower adapted to direct a strong blast of air across the first set of dressing riddles, and a blower adapted to direct a strong draft of air across the second set of dressing riddles and thence across the first set.

2. In a threshing machine, maize sheller or the like, in combination with a threshing cylinder, and means coöperating with said cylinder, a shaker grate to receive the beaten straw, a grain pan and caving riddles beneath said grate, a first set of dressing riddles beneath said caving riddles, a hinged chute to receive the capes from said riddles, a conveyer for leading the capes back to the threshing cylinder, a smutter at the upper end of said machine, a second set of dressing riddles below said cylinder, an elevator to convey grain from first set of riddles to the smutter, a down take pipe adapted to receive grain from said elevator and convey it to the second set of riddles, a slide in said pipe adapted at will to prevent the passage of grain from the elevator to said last named pipe, and an additional down take pipe for conveying grain from the smutter to the second set of dressing riddles.

3. In a threshing machine, maize sheller or the like, in combination with a threshing cylinder, and a concave coöperating with said cylinder, a beater mounted adjacent to said cylinder, a shaker grate to receive the beaten straw, a grain pan and caving riddles beneath said grate, a first set of dressing riddles beneath said caving riddles, a smutter at the upper end of said machine, a second set of dressing riddles below said cylinder, and means adapted at choice to feed the grain from said first set of dressing riddles to said second set of dressing riddles direct or by way of said smutter, and blowers arranged in series, one blower adapted to direct a blast across said first set of dressing riddles, and another blower adapted to direct a blast across both sets of dressing riddles.

4. In a threshing machine, maize sheller or the like, in combination with a threshing cylinder, and a concave coöperating with said cylinder, a beater mounted adjacent to said cylinder, a shaker grate to receive the beaten straw, a grain pan and caving riddles beneath said grate, a first set of dressing riddles beneath said caving riddles, a hinged chute to receive the capes from said riddles, a conveyer for leading the capes back to the threshing cylinder, a smutter at the upper end of said machine, a second set of dressing riddles below said cylinder, means adapted at choice to feed the grain from said first set of dressing riddles to said second set of dressing riddles direct or by way of said smutter, and blowers arranged in series, one blower adapted to direct a blast of air across said first set of dressing riddles, and another blower adapted to direct a blast across both sets of dressing riddles.

In testimony whereof I have signed my name to this specification in the presence of two subscribing witnesses.

THOMAS JOHN GEE.

Witnesses:
ALBERT EDWARD CAMMELL,
SIDNEY STONE.

Copies of this patent may be obtained for five cents each, by addressing the "Commissioner of Patents, Washington, D. C."